March 27, 1956
S. D. KRETZER
2,739,998
SUPPLEMENTAL GROUNDING DEVICE FOR
ELECTRICAL CONDUCTING CABLES
Filed March 5, 1951
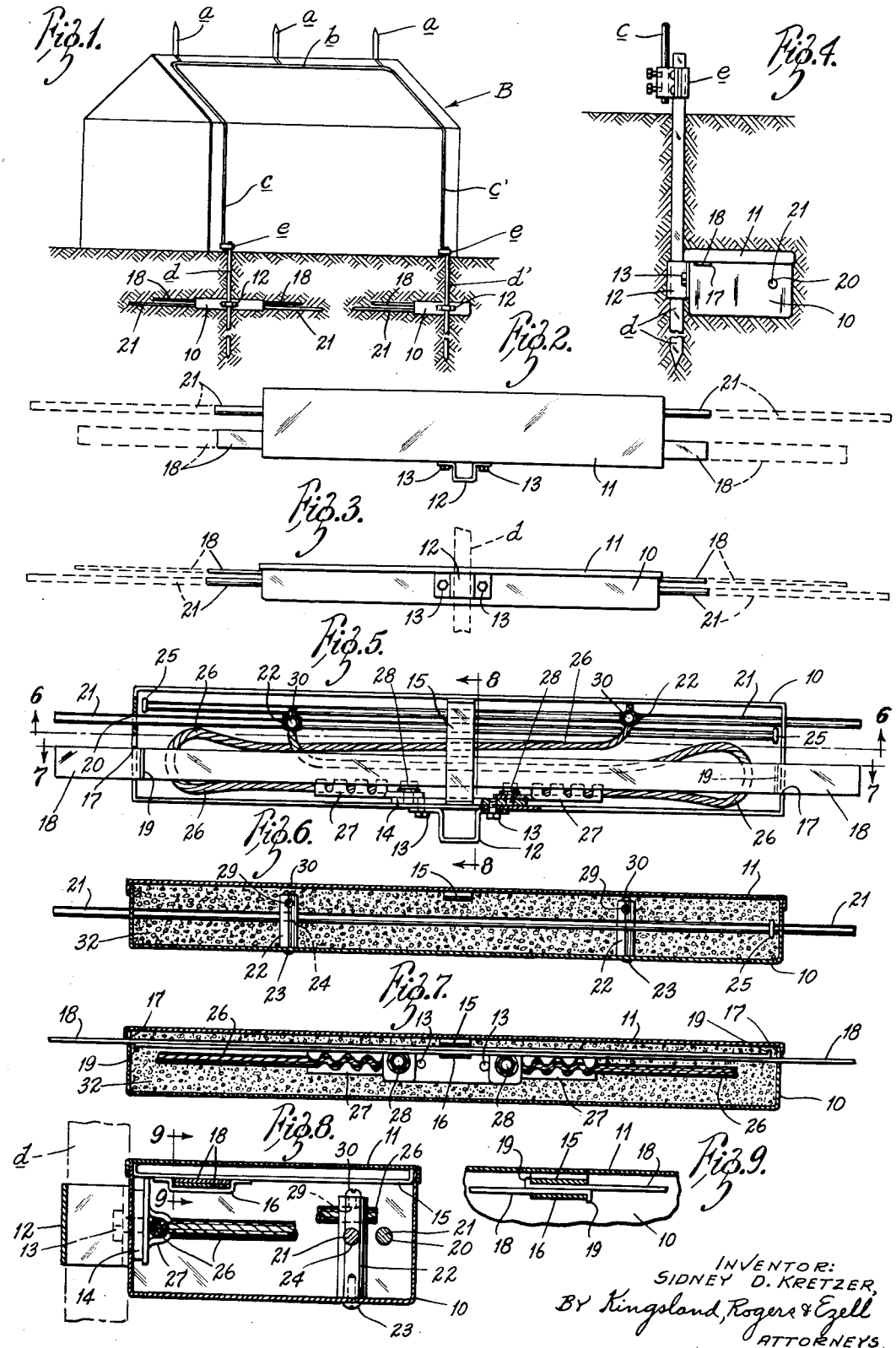
INVENTOR:
SIDNEY D. KRETZER,
BY Kingsland, Rogers & Ezell
ATTORNEYS

United States Patent Office 2,739,998
Patented Mar. 27, 1956

2,739,998
SUPPLEMENTAL GROUNDING DEVICE FOR ELECTRICAL CONDUCTING CABLES

Sidney D. Kretzer, St. Louis, Mo.

Application March 5, 1951, Serial No. 213,981

6 Claims. (Cl. 174—6)

This invention relates to a supplemental grounding device for electrically conducting cables particularly for use in lightning rod systems.

In the installation of lightning rod systems for the protection of buildings, it is important that the terminals be efficiently grounded. It is also important that the resistance of each grounded terminal be balanced so far as possible, and that the resistance at each terminal be within a standard limit. For example, when the system is tested, the resistance at each terminal should not exceed 5 ohms.

The character of the earth formation into which the usual ground stakes are driven and the extent of surface contact between such ground terminals primarily determines the electrical resistance at the terminals. In the ordinary installation, the ground stakes are usually driven to a depth of approximately ten feet and are connected with the down-drop cable, but, frequently, because of the different earth formations, the standard stake does not bring the resistance of the system within the standard limits. It is an advantage to be able to add additional ground contact so that the adjustment referred to may be conveniently made.

It is one of the primary objects, therefore, of the present invention to provide a supplemental adjustable ground contact device that may be electrically connected with each of the respective ground stakes so that, by increasing the surface-to-surface contact by means of the supplemental device, the resistance in the system may be balanced and the resistance at each ground brought within standard limits.

A more specific object of the invention is to provide a device of the character mentioned which may be conveniently connected with the ground stake of a lightning rod system terminal which includes extendible metallic members that extend laterally from the axis of the stake and which may be conveniently mounted in a trench near the surface of the ground so that, by adjustment, the surface contact of the terminal section of a lightning rod system may be increased or decreased to balance each terminal with the others in the system.

Another object is to reduce the electrical resistance at each ground rod by increasing the electrical conductivity between the ground contact device and the earth immediately adjacent thereto. More particularly, it is an object to increase the moisture content in the earth immediately adjacent the device by means contained within the device.

Other advantages of the invention will appear from the detailed description taken in connection with the accompanying drawing.

In one form, the device comprises a housing of generally rectangular shape which is adapted to be embedded in the earth and fastened to a ground rod of conventional construction. The housing contains a plurality of elongated electrical conductors which are electrically connected to the ground rod and which protrude from the housing. The conductors are slidably mounted in the housing so that they can be extended various distances from the housing to increase the surface area in contact with the earth, thereby varying the resistance of the "ground." The housing also contains a quantity of hygroscopic material for retaining moisture within the device so that the earth adjacent the device and the conductors is maintained in a relatively moist condition, thereby increasing the electrical conductivity between the device and the earth.

In the drawing,

Fig. 1 is a diagrammatic illustration showing the device of the present invention connected with an installed lightning rod system for the protection of a building;

Fig. 2 is a plan view of the device;

Fig. 3 is a front elevation of the device as it appears in Fig. 1;

Fig. 4 is an end elevation of the device connected with a standard ground stake;

Fig. 5 is a plan view with the cover of the case or housing removed;

Fig. 6 is a vertical section viewing the structure in the direction of the arrow and substantially on the line 6—6 of Fig. 5;

Fig. 7 is a vertical section viewing the structure in the direction of the arrow substantially on the line 7—7 of Fig. 5;

Fig. 8 is a cross-sectional view substantially on the line 8—8 of Fig. 5; and

Fig. 9 is a sectional view on the line 9—9 of Fig. 8.

In the embodiment of the invention illustrated, Fig. 1 is a diagrammatic view which serves to illustrate the terminal section of a lightning rod system showing two terminals, it being understood that in different installations a single terminal or more than two terminals may be employed. In this view, the building is indicated by B upon which a lighning rod system is installed, which system includes a plurality of lightning rod points $a$ connected by a horizontal lead of cable $b$ adjacent to the apex of the building roof. The cable is continuous with two down-drop or vertically extending cable sections $c$ and $c'$ which terminate at about the ground level. The ends of the sections $c$ and $c'$ are connected with the upper ends of ground stakes $d$ and $d'$, respectively, by a clamp $e$. It will be understood that the ground stakes $d$ and $d'$, in a normal installation, are driven into the ground to a depth of approximately ten feet and provide the principal means of grounding the system.

As has already been mentioned, the efficiency of the grounding system may vary because of the nature of the earth formation in which the ground stakes are driven. In practice, the installed system ordinarily would have a number of ground stakes, and, since it is important that the resistance at each terminal be balanced, it is sometimes difficult to adjust the resistance factor by the use of the stakes alone to bring it within permissible limits and without substantial variation at each terminal. The device of the present invention tends to overcome this difficulty, as it is connected into the grounding section of each of the lightning rod terminals.

To this end, the device of the present invention comprises generally a rectangular case or housing 10 which is provided with a cover member 11 so that, when the device has been installed, the cover is put in place to form a closed housing, and the device is covered with earth.

In an ordinary installation, it would be placed in a trench fairly close to the ground surface, that is to say, at a depth of about two feet. After the initial installation, if the occasion should arise to make any further adjustment, it would be easily accessible.

The housing of the device has a metallic external clevis 12 which, as illustrated, is a U-shaped member with laterally extending flanges. It is attached to the front wall of the housing 10 by metallic bolts 13 which extend through the wall of the housing. The ground stake d, as illustrated, is seated through the clevis and the bolts 13 pass through the lateral flanges connecting it to housing wall. A metallic plate 14 is mounted behind the member 12 on the interior surface of the housing.

A metallic cross strip 15 bridges across the housing from the plate 14 to the opposite wall and carries on its underface a bracket 16 which has a U-shaped central portion from which lateral flanges extend. The bracket is connected to the lower wall of the member 15 as by soldering or brazing.

The top edges of the end walls of the housing below the cover 11 are cut out to form U-shaped guideways 17. These guideways are in alignment with the opening in the bracket 16.

A pair of elongated flat metal strips 18 are mounted in overlapping position and are supported at one end in the bracket 16. These strips extend in opposite directions and seat in the guideways 17, respectively. Thus, said strips 18 may be slid outwardly in opposite directions from each end of the housing for selected distances, thereby increasing or decreasing the electrical conducting surfaces that are in contact with the ground. In order to prevent the strips 18 from being pulled out of the housing and also to arrest the inward movement, each of said strips is provided with a flange 19, the one on the lower strip turned down and the one on the upper strip turned up, so that, when the strips have been protracted to their full extent, the flanges will engage with the edges of the cross-strip 15, and, when the strips are retracted, they will abut against the side edges of the guideways 17.

In order to provide additional ground contacting surface, there is provided a second pair of adjustable members which are electrically connected with the ground stake. These members are likewise mounted in the housing.

A pair of openings 20 in opposite ends of the housing provide guideways. These openings are in alignment and on the side of the housing opposite to that in which the strips 18 are mounted.

As illustrated, this second pair of adjustable members are in the form of metallic rods 21. The inner sections of these rods are supported by a pair of spaced posts 22 which are connected to the bottom wall of the housing by screws 23.

These posts are provided with openings 24 which align with the openings 20 and serve to support the inner ends of the rods 21. The rods 21, therefore, may be protracted and retracted from and within the housing.

These rods have their inner ends enlarged as at 25 to prevent them from being pulled out of the housing when extended.

The rods 21 are electrically connected with the ground stake by flexible connections in the form of wire cables 26 extending to the posts 22, respectively, at one end and connected with the plate 14 at the opposite end. The means of connecting the one end of each of said cables with the plate 14 comprise cable clamps 27 screw connected to the plate by screws 28. The opposite ends of the flexible connections 26 are connected to the posts 22 by means of a socket 29 into which the ends of the flexible cables extend and in which they are held in place by screws 30.

As shown only in Figs. 6 and 7, a quantity of charcoal 32 or other hygroscopic material is packed within the housing 10 about the metal strips 18 and rods 21 so as to keep the interior of the housing in a moist condition. Some of the moisture is deposited on the surface of the strips 18 and the rods 21 and passes through the guideways 17 and openings 20 so as to maintain the earth adjacent the strips 18 and rods 21 in a relatively moist condition. This increases the electrical conductivity between the device and the earth so as to materially decrease the resistance of the ground terminal. The interior of the housing 10 is normally moistened before the device is embedded in the earth, and each time the earth is soaked by rain, etc., the moisture within the housing 10 is replenished.

In installing the device of the present invention, one unit is mounted on each of the ground stakes of the ground section of a lightning rod system in the manner explained. The device is mounted in a trench, as indicated, about two feet below the ground. The trench is extendetd sufficiently beyond the end walls of the housing so that a sufficient length of the strips 18 and the rods 21 may be protracted from the housing until the test at each terminal shows a resistance within permissible limits. Each of the devices connected with the several terminals is adjusted so that the resistance of all of them is within reasonable limits, thereby balancing the entire system.

It is contemplated that after the adjustment and tests have been made, it will be unnecessary to make further adjustments, but, inasmuch as the devices are conveniently accessible from the ground level, if additional adjustments are required, this can be accomplished with a minimum degree of effort.

It will, therefore, be apparent that the invention fully accomplishes its objectives; means are provided for quickly and easily reducing the resistance at each ground to bring it within specified limits and to balance each ground, one with the other. Also, the moisture retaining means keeps the earth adjacent the device in a moist condition so as to maintain good conductivity between the device and the earth.

It will be understood that the structure while particularly described may be varied within limits and still remains within the appended claims.

What is claimed is:

1. A device of the type described, comprising a housing of generally rectangular shape having opposed end walls; a bracket associated with the housing for fastening it to a ground rod; a supporting bracket within the housing electrically connected with the fastening bracket; an elongated, rigid electricity conducting member mounted on said supporting bracket for sliding movement relative thereto independently of said ground rod; an aperture in one end wall of a size to slidably receive said member for back and forth movement whereby the latter can be extended various predetermined distances outside the housing to vary the surface contact area on the outside of said housing; and means limiting the sliding movement of the member relative to the supporting bracket.

2. A device of the type described, comprising a housing of generally rectangular shape having opposed end walls and a bottom wall; a bracket fastened to the housing for connecting it to a ground rod; a plurality of posts of electricity conducting material fastened to the bottom wall, each post having a transverse opening therethrough; a rigid rod-like member of electricity conducting material slidably disposed for back and forth movement in each opening; apertures in the end walls of a size to slidably receive said member whereby they can be extended to various predetermined distances from the housing, each of said members being extensible outside of said housing so as to vary the total surface area of contact on the exterior of said housing; means electrically connecting the posts with the bracket; and hygroscopic material disposed within the housing about the rod-like member adjacent the apertures.

3. A device of the type described, comprising a housing of generally rectangular shape having opposed end walls, a bottom wall, and a removable cover; a bracket fastened to the outside of said housing for connecting to to a ground rod whereby said ground rod is adapted to to received entirely exteriorly of said housing; a plurality of posts of electricity conducting material fastened to the bottom wall; each post having a transverse opening therethrough; a rigid rod-like member of electricity conducting material slidably disposed for back and forth movement in each opening; means associated with each member for limiting its movement relative to the post in one direction; apertures in the end walls to slidably receive said members whereby they can be extended to various predetermined distances from the housing, each of said members being extensible outside of said housing so as to vary the total surface area of contact on the exterior of said housing, and flexible electrical conductors connecting the posts with the bracket.

4. A device of the kind described adapted to be connected into the ground section of a lightning protection system, comprising a housing having a guideway in one end thereof; an electrical conducting bracket support mounted within said housing; an elongated strip-like rigid electrical conductor slidably mounted for back and forth movement in said support in electrical conducting relation therewith and extending through said guideway; a plurality of posts of electricity conducting material fastened to the housing; each post having a transverse opening therethrough; a rigid rod-like member of electricity conducting material slidably disposed for back and forth movement in each opening; apertures in the housing of a size to receive slidably said members whereby they can be extended various predetermined distances from the housing, each of said members being extensible outside of said housing so as to vary the total surface area of contact on the exterior of said housing; and means for electrically connecting said support and said posts with the ground section of said lighting protection system.

5. A device of the kind described adapted to be connected into the ground section of a lightning protection system, comprising a housing having a guideway in one end thereof; an electrical conducting bracket support mounted within said housing; an elongated strip-like rigid electrical conductor slidably mounted for back and forth movement in said support in electrical conducting relation therewith and extending through said guideway; a plurality of posts of electricity conducting material fastened to the housing; each post having a transverse opening therethrough; a rod-like member of electricity conducting material slidably disposed for back and forth movement in each opening; apertures in the housing of a size to receive slidably said members whereby they can be extended various predetermined distances from the housing, each of said members being extensible outside of said housing so as to vary the total surface area of contact on the exterior of said housing; means for electrically connecting said support and said posts with the ground section of said lightning protection system; and hygroscopic material disposed within the housing about the elongated electrical conductor and the rod-like member adjacent the guideway and the apertures.

6. A device of the kind described adapted to be connected into the ground section of a lightning protection system, comprising a housing having a guideway in one end thereof; an electrical conducting bracket support mounted within said housing intermediate end walls of said housing; an elongated strip-like rigid electrical conductor slidably mounted for back and forth movement in said support in electrical conducting relation therewith and extending through said guideway; a plurality of posts of electricity conducting material fastened to the housing, said posts including at least one post situated between said bracket support and one end wall and another post correspondingly situated between said bracket support and the opposite end wall; each post having a transverse opening therethrough; a rigid rod-like member of electricity conducting material slidably disposed for back and forth movement in each opening; apertures in the housing of a size to receive slidably said members whereby they can be extended various predetermined distances from the housing, each of said members being extensible outside of said housing so as to vary the total surface area of contact on the exterior of said housing; and means for electrically connecting said support and said posts with the ground section of said lightning protection system.

References Cited in the file of this patent

UNITED STATES PATENTS

| | | |
|---|---|---|
| 362,062 | Cole | May 3, 1887 |
| 895,916 | Turner | Aug. 11, 1908 |
| 1,036,143 | Phillips | Aug. 20, 1912 |
| 1,329,167 | Ebeling | Jan. 27, 1920 |
| 2,224,032 | Kline | Dec. 3, 1940 |

FOREIGN PATENTS

| | | |
|---|---|---|
| 262,281 | Great Britain | Dec. 9, 1926 |